United States Patent [19]
Kaneko et al.

[11] Patent Number: 5,655,827
[45] Date of Patent: *Aug. 12, 1997

[54] SURFACE LIGHT SOURCE DEVICE

[75] Inventors: Isamu Kaneko; Hideaki Katoh; Kazuaki Yokoyama, all of Saitama-ken; Tsuyoshi Ishikawa, Tokyo-to, all of Japan

[73] Assignee: Enplas Corporation, Kawaguchi, Japan

[ * ] Notice: The term of this patent shall not extend beyond the expiration date of Pat. No. 5,414,599.

[21] Appl. No.: 397,834

[22] Filed: Mar. 2, 1995

Related U.S. Application Data

[63] Continuation of Ser. No. 910,746, Jul. 8, 1992, Pat. No. 5,414,599.

[30] Foreign Application Priority Data

Sep. 9, 1991 [JP] Japan ................................ 3-80357
Nov. 28, 1991 [JP] Japan ................................ 3-105342

[51] Int. Cl.⁶ ........................................................ F21V 8/00
[52] U.S. Cl. .................... 362/31; 362/27; 362/330; 362/339
[58] Field of Search ............................ 362/27, 31, 330, 362/339, 26, 329, 337; 40/546

[56] References Cited

U.S. PATENT DOCUMENTS

| | | |
|---|---|---|
| 4,642,736 | 2/1987 | Masuzawa et al. . |
| 4,714,983 | 12/1987 | Lang . |
| 4,729,067 | 3/1988 | Ohe . |
| 4,791,540 | 12/1988 | Dreyer, Jr. et al. . |
| 4,974,122 | 11/1990 | Shaw . |
| 4,975,807 | 12/1990 | Ohashi . |
| 5,040,098 | 8/1991 | Tanaka et al. . |
| 5,064,276 | 11/1991 | Endo et al. . |
| 5,136,480 | 8/1992 | Pristash et al. . |
| 5,381,309 | 1/1995 | Borchardt . |

FOREIGN PATENT DOCUMENTS

| | | |
|---|---|---|
| 392863 | 10/1990 | European Pat. Off. . |
| 395344 | 10/1990 | European Pat. Off. . |
| 30346 | 5/1926 | France . |
| 2576441 | 7/1986 | France . |
| 369101 | 3/1991 | Japan . |
| 4146401 | 5/1992 | Japan . |
| 315743 | 8/1929 | United Kingdom . |
| 325957 | 3/1930 | United Kingdom . |

*Primary Examiner*—Carl D. Price
*Attorney, Agent, or Firm*—Cushman, Darby & Cushman IP Group of Pillsbury Madison & Sutro LLP

[57] ABSTRACT

A surface light source device comprising at least one light source, a transparent panel, a diffusing panel and a reflecting surface. This surface light source device is configured so that brightness is enhanced in a direction perpendicular to the diffusing panel by disposing, on the side of a front surface of the transparent panel, a transparent sheet which has protrusions having a saw-tooth-like sectional shape formed on one surface thereof.

11 Claims, 5 Drawing Sheets

SURFACE LIGHT SOURCE DEVICE

This is a continuation of application Ser. No. 07/910,746, filed Jul. 8, 1992, now U.S. Pat. No. 5,414,599.

BACKGROUND OF THE INVENTION a) Field of the Invention

The present invention relates to a surface light source device which is to be used as a back light for liquid crystal display units, and more specifically to a surface light source device which uses a transparent panel member or a reflecting panel member.

b) Description of the Prior Art

The conventional surface light source device which uses a transparent panel has a composition as illustrated in FIG. 1. In this drawing, the reference numeral 1 represents a light source, the reference numeral 2 designates a transparent panel, the reference numeral 3 denotes a diffusing panel and the reference numeral 4 represents a reflecting surface. The light source 1 used in this surface light source device is a linear light source which is, for example, a cold cathod ray tube and extends in the direction perpendicular to the paper surface. The transparent panel 2 is made of a glass material or a transparent plastic material. As a material for the transparent panel 2, it is generally known to select a plastic material such as acrylic resin which is light in weight thereof and available at a low cost. The transparent panel 2 has a form of a plane parallel plate which has thickness of t and a rectangular or square surface. A light beam emitted from the linear light source 1 enters through an end surface of incidence 2a into the transparent panel 2 and travels through the transparent panel 2 as represented by a ray 10 in FIG. 1. During this travel, portions of the light beam emerge from the transparent panel 2 (upward in FIG. 1) and pass through the diffusing panel 3 to produce diffused rays. The surface light source device produces the diffused rays which are diverging from various points on the surface of the diffusing panel (the upper surface shown in FIG. 1) as described above. The ray 10 shown in FIG. 1 is diverged from a point A on the diffusing panel 3. In a case where the diffusing panel 3 should not be used, a ray which travels in a direction having an angle of $\gamma$ indicated by an arrow has the highest brightness. The angle $\gamma$ has a value which is different dependently on refractive indices of materials selected for the transparent panel 2. Experiments effected by selecting an acrylic resin having a refractive index of 1.49 indicated results that the angle $\gamma$ has a value of approximately 75°. When the diffusing panel 3 is placed over the transparent panel 2 so that rays having passed through the diffusing panel 3 are diffused, deflection of the rays is corrected a little due to the diffusion of the rays, but brightness in the direction perpendicular to the transparent panel is not enhanced so remarkably. When a liquid crystal display panel, for example, is illuminated by using the surface light source device which uses the diffusing panel 3 placed over the transparent panel 2, the brightness of the diffused rays is low in a direction for observation, i.e., in a direction having the angle $\gamma=0°$, whereas brightness of the diffused rays is the highest in an oblique direction having an angle $\gamma\approx 75°$ which is deviated from the direction for observation. Accordingly, an observer of the liquid crystal display panel is undesirably obliged to observe an image which is relatively dark.

As another conventional example of the surface light source device which uses the transparent panel, there is also known the surface light source device illustrated in FIG. 2. In this conventional example, two linear light sources 1 are disposed beside both end surfaces of a transparent panel 5. The two light sources 1 are adopted for obtaining a surface light source device which can provide diffused rays having higher brightness.

Further, the transparent panel 7 of the surface light source device illustrated in FIG. 2 has a thinned central portion (the portion farthest from the light sources disposed on the right and left sides) and a top surface 7b which is inclined.

The surface light source device illustrated in FIG. 2 is configured so that light beams emitted from the right side and left side light sources 1 enter through end surfaces of incidence 7a of the transparent panel 7, and emerge out of a diffusing panel 3 so as to produce diffused rays. In the case of the surface light source device which uses the inclined top surface 7b, rays emerging from the transparent panel 7, for example rays 10 and 11, have the highest brightness at an inclination angle which is a little smaller, or the angle $\gamma$ has a value of approximately 60°. However, the surface light source device illustrated in FIG. 2 cannot provide the diffused rays which have sufficient brightness in the direction for observation and causes the observation of relatively dark images.

In addition, there are known transparent panels each of which has thickness progressively thinned along a curve from an end surface of incidence as well as those each of which has thickness progressively thinned along curves from a plurality of end surfaces of incidence. There are also known transparent panels each of which is combined with a plurality of light sources and has uniform thickness.

SUMMARY OF THE INVENTION

A primary object of the present invention is to provide a surface light source device which comprises at least one light source, a transparent panel having at least one end surface of incidence disposed in the vicinity of the light source, two diffusing panels disposed on a top surface of the transparent panel with a space reserved between the two diffusing panels, and a reflecting surface disposed on a rear surface of the transparent panel.

Another object of the present invention is to provide a surface light source device which comprises at least one light source, a transparent panel having at least one end surface of incidence disposed in the vicinity of the light source, a diffusing panel disposed on a top surface of the transparent panel, a transparent sheet having, on one surface thereof, protrusions which have a saw-tooth-like sectional shape, and a reflecting surface disposed on a rear surface of the transparent panel.

The surface light source device according to the present invention enhances brightness in a direction perpendicular to the diffusing panels or panel by using the two diffusing panels or the transparent sheet having the surface on which saw-tooth-like protrusions are formed as described above.

The transparent sheet may have a form which has a large number of very small conical or pyramidal protrusions formed on one surface. Further, tips or vertices of the conical or pyramidal protrusions may be rounded.

Formed on one surface of the transparent sheet are rows of the protrusions which have the saw-tooth-like sectional shape.

In a particular case where the surface light source device according to the present invention is to be used as a back light for a liquid crystal display panel, it is preferable, for preventing stripe patterns from appearing on a display panel of the liquid crystal display unit, to configure the transparent sheet so that the rows of the top lines of the protrusions are oblique relative to bus lines or sides of a frame of the display panel.

Further, in the case where the transparent sheet has a large number of the conical or pyramidal protrusions, it is desirable that rows of the protrusions are oblique relative to the bus lines or the sides of the frame of the liquid crystal display panel as in the case described above.

It should be noted that the above effect can be obtained even when the top lines of the protrusions on the rows of the protrusions are only slightly inclined with respect to the bus lines or the sides of the frame of the liquid crystal panel.

DETAILED DESCRIPTION OF THE PREFERRED EMBODIMENTS

Figure 3:
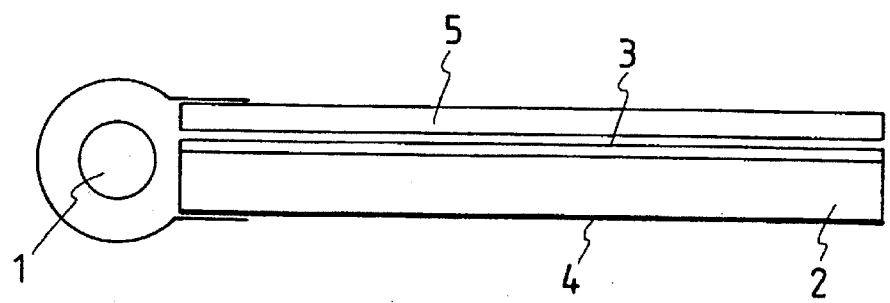
FIG. 3 through FIG. 8 show sectional views illustrating compositions of first through sixth embodiments of the surface light source device according to the present invention.

The first embodiment of the surface light source device according to the present invention is illustrated in FIG. 3, wherein the reference numeral 1 represents a light source, the reference numeral 2 designates a transparent panel, the reference numeral 3 denotes a diffusing panel and the reference numeral 4 represents a reflecting panel. The first embodiment of the present invention has a composition which is substantially the same as that of the conventional surface light source device illustrated in FIG. 1. The reference numeral 5 represents another diffusing panel which is adopted for enhancing brightness or luminance in the direction for observation (the direction perpendicular to the diffusing panels shown in FIG. 3). In other words, the diffusing panel 5 serves for enhancing brightness in the direction for observation by further diffusing rays (or controlling directions of rays) travelling in the direction at the angle of $\gamma$ shown in FIG. 1 so that a portion of the ray is directed upward (in the direction for observation).

Figure 1:
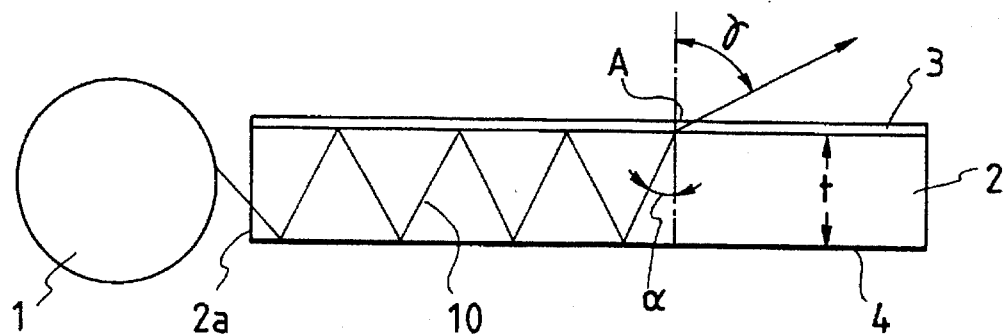
FIG. 1 shows a sectional view illustrating a composition of the conventional surface light source device.

Experiments which were effected for comparing the conventional surface light source device shown in FIG. 1 with the first embodiment of the present invention indicated results that brightness in the direction perpendicular to the diffusing panel 3 is approximately 25% higher in case of the first embodiment of the present invention.

Figure 4:
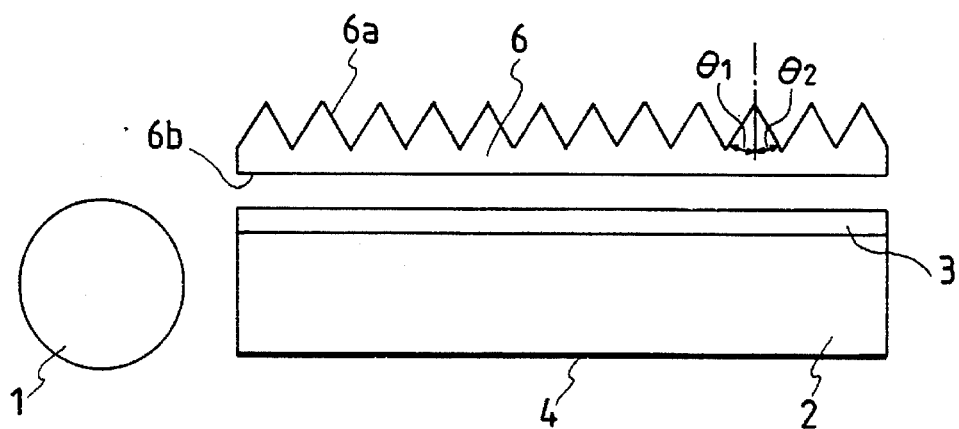

FIG. 4 shows the second embodiment of the present invention, wherein the diffusing panel 5 used in the first embodiment is replaced with a transparent sheet 6 having a surface on which protrusions 6a having a sectional shape of saw teeth are formed in rows nearly parallel with one another are formed.

In the case of the second embodiment, rays which have emerged from the transparent panel 2 and passed through the diffusing panel 3 become diffused rays, which are refracted so as to be controlled in a direction perpendicular to the diffusing panel 3 by the surface having the saw-tooth-like protrusion 6a formed on the transparent sheet so as to enhance brightness in the direction perpendicular to the diffusing panel 3.

Experiments indicated that the second embodiment enhanced brightness approximately 50% in the direction of $\gamma=0°$ as compared with the brightness available with the surface light source device illustrated in FIG. 1.

In the second embodiment described above, it is possible to omit the diffusing panel 3 by designing the surface of the transparent sheet 6 as a coarse surface though the brightness in the direction for observation is not enhanced so much in this case.

In the second embodiment, relationship between $\theta_1$ and $\theta_2$ shown in FIG. 4 may be $\theta_1=\theta_2$, $\theta_1<\theta_2$ or $\theta_1>\theta_2$ for selecting a shape for the saw-tooth-like protrusions.

When $\theta_1$ is largely different from $\theta_2$, however, the saw-tooth-like protrusions will produce an undesirable influence on observation of images in a case of application where the second embodiment is used as a surface light source for illumination. Therefore, it is desirable that $\theta_1$ is equal or nearly equal to $\theta_2$. A transparent panel which has the saw-tooth-like protrusions designed for $\theta_1=\theta_2$ was used for the experiments which were effected for comparing the conventional surface light source device with the second embodiment of the present invention as described above. The conventional example using the transparent panel made of acrylic resin provided the angle of $\alpha$ which was experimentally confirmed as 74.6° as described above. It is therefore considered that the angle $\alpha$ of the ray 10 shown in FIG. 1 is approximately 40°. Accordingly, it is considered that rays which travel through the transparent panel like the ray 10 shown in FIG. 1 have the maximum intensity. So far as the angle $\alpha$ shown in FIG. 1 is kept unchanged, the angle $\gamma$ has a value which is smaller as the transparent panel 2 has a smaller refractive index. Consequently, the angle $\gamma$ has a smaller value and the brightness in the direction perpendicular to the diffusing panel 3 is enhanced as the transparent panel has a smaller refractive index in both the first and second embodiments of the present invention described above. On an assumption of $\alpha=40°$ it is possible to obtain $\gamma=68.8°$ as understood from the formula shown below by using polymethylpentene (n=1.45) as a material for the transparent panel:

$$\sin \gamma = n \sin \alpha$$

The angle γ was approximately 69° in experiments effected by using a surface light source device which had the composition shown in FIG. 1 and used a transparent panel made of polymethylpentene.

In the first and second embodiments described above, usable as materials for the transparent panel are not only acrylic resin and polymethylpentene but also other materials so far as these materials have high transparency and heat resistance. It is preferable to select, among these materials, one which has a low refractive index as a material for the transparent panel.

In the second embodiment described above, the transparent sheet is not limited to the one which has the protrusions which have the saw-tooth-like sectional shape and formed in rows on one surface thereof. For example, the transparent panel may have a large number of minute prism-like protrusions formed on one surface thereof. Further, conical shapes or pyramidal shapes may be selected in place of the prism-like shape.

Figure 5:
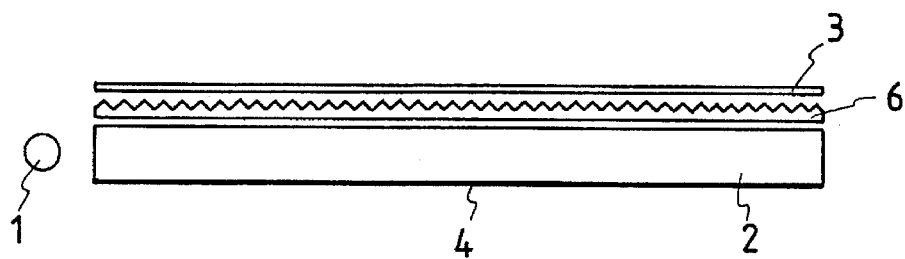

FIG. 5 shows the third embodiment of the surface light source device according to the present invention wherein a transparent sheet 6 which has protrusions 6a having saw-tooth-like sectional shape are formed on one surface thereof is disposed in the vicinity of a surface (the upper surface in FIG. 5) of the transparent panel 2 and a diffusing panel 3 is disposed outside the transparent sheet 6.

The third embodiment of the present invention has an effect which is similar to that of the second embodiment of the present invention.

Figure 2:
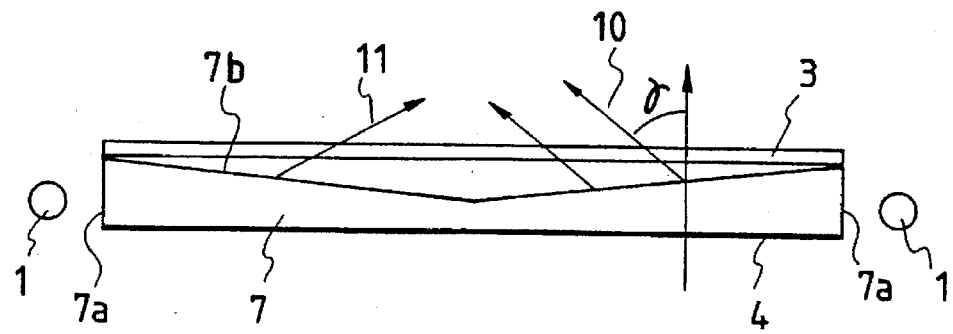
FIG. 2 shows a sectional view illustrating a composition of a different type of the conventional surface light source device.
Figure 6:
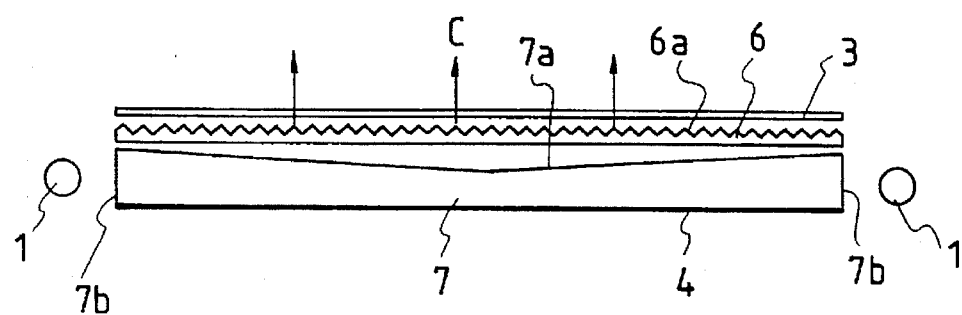

FIG. 6 illustrates the fourth embodiment of the surface light source device according to the present invention wherein the concept of the present invention applied to the conventional surface light source device shown in FIG. 2 so that brightness is enhanced in the direction perpendicular to the diffusing panel. Speaking concretely of the fourth embodiment, light sources 1 are disposed on both sides of a transparent panel 7 which has a thinned central portion, and a transparent sheet 6 which has protrusions 6a having saw-tooth-like sectional shape formed on one surface thereof and a diffusing panel 3 are disposed on the side of the surface 7a of the transparent panel as illustrated in FIG. 7.

In the fourth embodiment, light beams emitted from the light sources 1 and entering into the transparent panel 7 are refracted a little upward by the surface 7a which is inclined relative to the bottom surface of the transparent panel 7, refracted further upward by the protrusions formed on the surface having the saw-tooth-like protrusions 6a of the transparent sheet 6 and pass through the diffusing panel 3, thereby becoming diffused rays. Accordingly, luminance of the diffused rays is enhanced in the direction C perpendicular to the diffusing panel 3 so as to assure brightness sufficient for observation.

Figure 7:
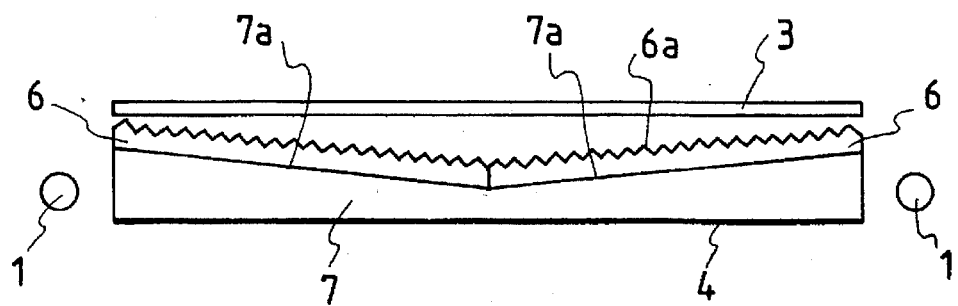

FIG. 7 illustrates the fifth embodiment of the surface light source device according to the present invention which consists of two light sources 1, a transparent panel 7 having a thinned central portion, two transparent sheets 6 which are disposed in contact with a surface 7a of the transparent panel 7 on which protrusions having saw-tooth-like sectional shape are formed, and a diffusing panel 3. Owing to this composition, the fifth embodiment has an effect which is similar to that of the fourth embodiment.

Figure 8:
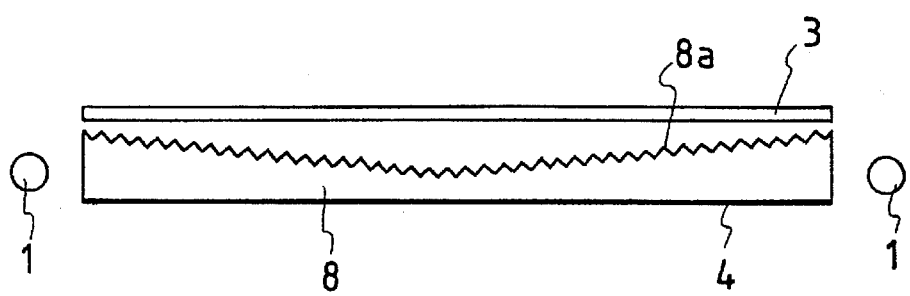

FIG. 8 illustrates the sixth embodiment of the surface light source device according to the present invention wherein a transparent panel 8 has a thinned central portion and an upper surface on which protrusions 8a having saw-tooth-like sectional shape are formed. Speaking detailedly, the sixth embodiment consists of the two light sources 1, the transparent panel 8 having the surface on which the protrusions 8a having the saw-tooth-like sectional shape are formed and a diffusing panel 3. The sixth embodiment can provide an effect similar to those of the other embodiments without using a transparent sheet having the saw-tooth-like protrusions formed on one surface thereof.

Figure 9:
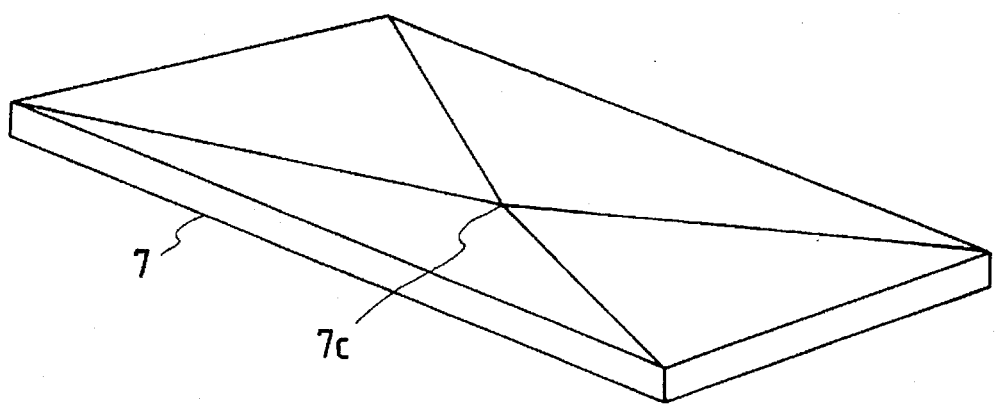
FIG. 9 shows a perspective view of a transparent panel which is tinned at a central portion thereof for use in a surface light source device equipped with four light sources disposed besides the four sides of the transparent panel.

FIG. 9 shows a transparent panel which has a thinned central portion and is to be used with the surface light source device equipped with four light sources disposed besides all the four sides of the transparent panel.

The concepts of the fourth through the sixth embodiments shown in FIG. 6 through FIG. 8 respectively are applicable also to the surface light source device using the transparent panel illustrated in FIG. 9.

Figure 10:
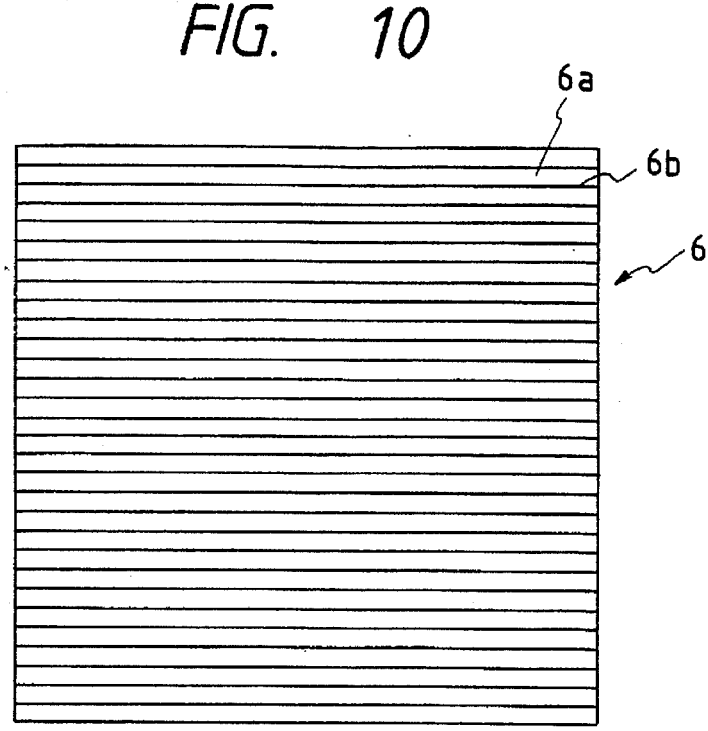
FIG. 10 shows a plan view of a transparent panel which is to be used in the surface light source device according to the present invention.
Figure 11:
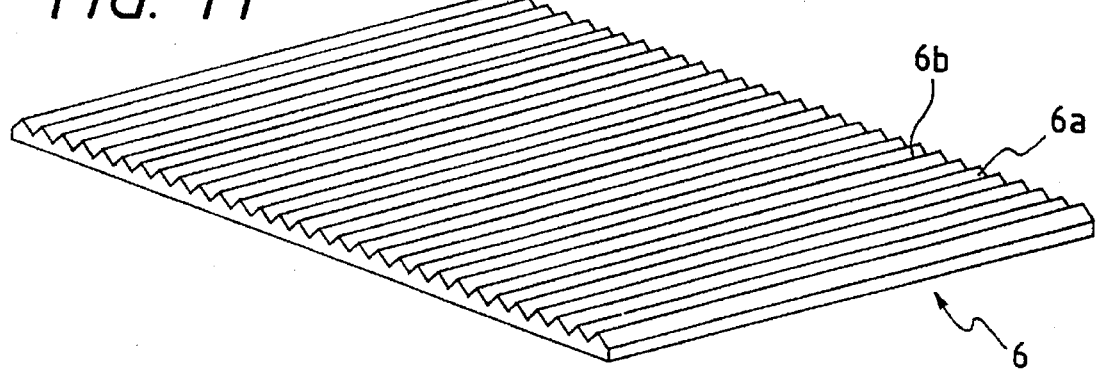
FIG. 11 shows a perspective view of the transparent sheet shown in FIG. 10.

Each of the second through the fifth embodiments described above adopts the transparent sheet which has protrusions having the saw-tooth-like sectional shape formed on one surface thereof. This transparent sheet has a sectional shape, for example, as in FIG. 4. A top view (of the transparent panel shown in FIG. 4) is illustrated in FIGS. 10 and 11 wherein rows of the top lines 6b of the protrusions having the saw-tooth-like sectional shape (or rows of the vertices of the protrusions having prism-like sectional shape) are arranged in parallel with one another.

Figure 12:
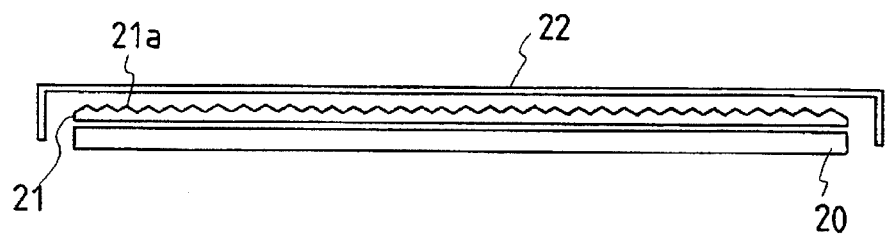
FIG. 12 shows a schematic sectional view illustrating an overall configuration of a combination liquid crystal display panel and the surface light source device according to the present invention used as a back light for the liquid crystal display panel.

FIG. 12 is a schematic sectional view illustrating a combination of a liquid crystal display panel and the surface light source device according to the present invention which is used as a back light for the liquid crystal display panel. In FIG. 12, the reference numeral 20 represents the surface light source device, the reference numeral 21 designates the transparent sheet which has protrusions having the saw-tooth-like sectional shape formed on one surface thereof and the reference numeral 22 denotes the liquid crystal display panel.

When the surface light source device comprising the transparent sheet is used as a back light for the liquid crystal display panel as shown in FIG. 12, observation of images is hindered by stripe patterns which appear on the liquid crystal display panel.

Figure 13:
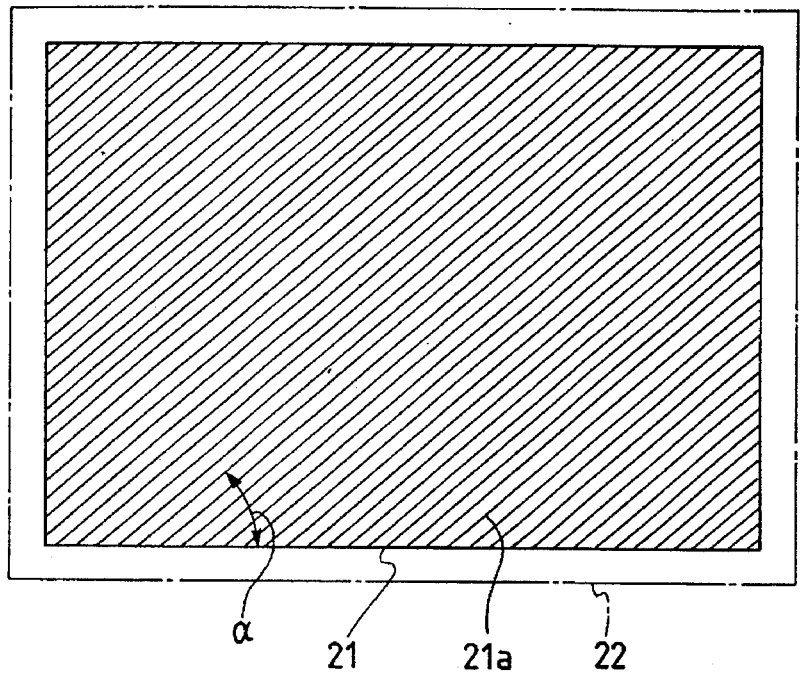
FIG. 13 shows a plan view illustrating the transparent sheet which has oblique rows of the top lines of protrusions which has a saw-tooth-like sectional shape.
Figure 14:
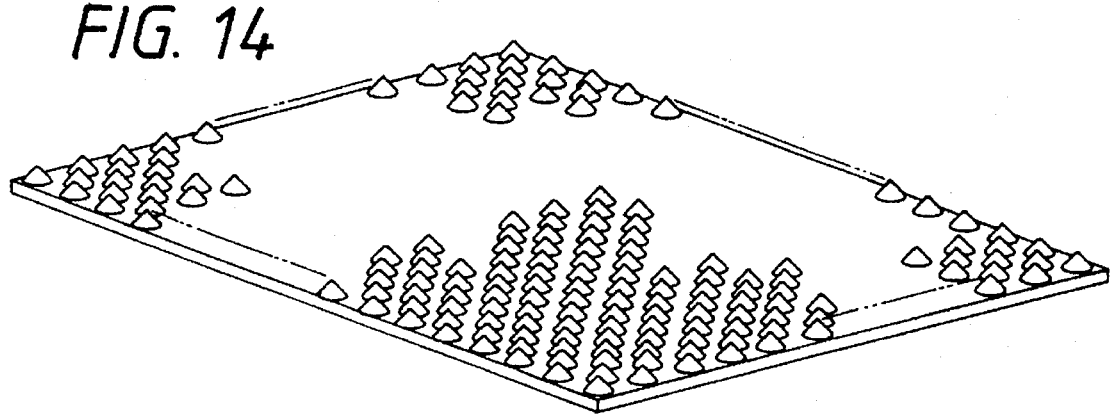
FIG. 14 shows a perspective view of the transparent sheet which has oblique rows of vertices of conical protrusions.

For correcting this defect, it is sufficient to configure the transparent sheet so that the rows of the top lines of the protrusions having the saw-tooth-like sectional shape are obliquely disposed as shown in FIG. 13. An effect to efface the stripe patterns can be obtained even if the inclined angle ω of the rows of the top lines relative to bus lines or sides of a frame of a liquid crystal panel is very small. However, the effect is reduced substantially if the angle ω becomes too small. The angle α should desirably be 45°. In place of the above transparent sheet (the transparent sheet as FIG. 13), the transparent sheet as shown in FIG. 14 may be used.

Figure 15:
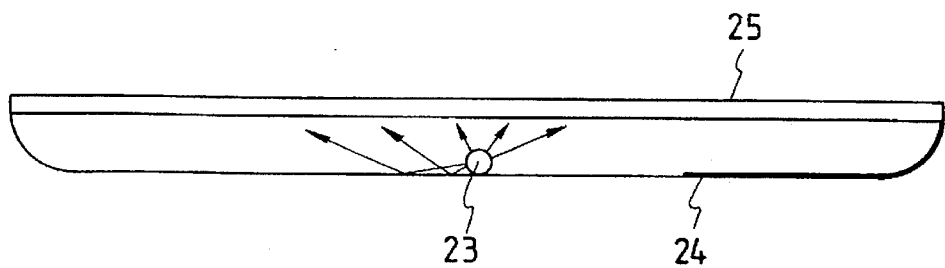
FIG. 15 shows a sectional view illustrating an example of a surface light source device wherein the transparent panel shown in FIG. 12 is utilized in a surface light source device of the type using a reflecting panel.

FIG. 15 illustrates a surface light source device which consists of a light source 23, a reflecting panel 24 and a diffusing panel 25, and is configured so that some of the light beams emitted from the light source 23 travel directly to the diffusing panel 25, whereas the others of the light beams are reflected by the reflecting panel 24 and then directed toward the diffusing panel 25, whereby a distribution of luminance is relatively uniform over the diffusing panel 25. In the case of the surface light source device shown in FIG. 15 also, brightness can be enhanced in the direction perpendicular to the diffusing panel 25 by equipping the diffusing panel 25 with the transparent sheet which is adopted in the embodiments of the surface light source device according to the present invention.

We claim:

1. A surface light source device comprising:
   a transparent panel made of a transparent material and having a rectangular plate-like shape;

at least one linear light source disposed in a vicinity of at least one edge surface of said transparent panel;

a transparent sheet having a plurality of saw-tooth-like sectional shape protrusions each having a ridge, said ridges forming a plurality of substantially parallel rows on a surface of said transparent sheet; and a reflecting surface disposed on a rear surface of said transparent panel;

wherein said plurality of substantially parallel rows of protrusions having said saw-tooth-like sectional shape are disposed at an angle greater than 0° but less than 90° with respect to said at least one edge surface of said transparent panel.

2. A surface light source device comprising:

a transparent panel made of a transparent material and having a rectangular plate-like shape;

at least one linear light source disposed in a vicinity of at least one edge surface of said transparent panel;

a diffusion panel;

a transparent sheet having a plurality of saw-tooth-like sectional shape protrusions each having a ridge, said ridges of said plurality of saw-tooth-like sectional shape protrusions forming a plurality of substantially parallel rows on a surface of said transparent sheet, said surface of said transparent sheet facing away from said diffusion panel; and a reflecting surface disposed on a rear surface of said transparent panel;

wherein said plurality of substantially parallel rows of protrusions having said saw-tooth-like sectional shape are disposed at an angle greater than 0° but less than 90° with respect to said at least one edge surface of said transparent panel.

3. A surface light source device according to claim 2, wherein:

said diffusion panel is disposed between said transparent panel and said transparent sheet.

4. A surface light source device according to claim 3, further comprising:

a second light source disposed beside a second edge surface of said transparent panel, said second edge surface of said transparent panel being opposite to said first edge surface of said transparent panel, and said transparent panel having a thickness at said first edge surface and a second thickness at said second edge surface which are both larger than a third thickness at a portion of said transparent panel removed from said first edge surface and said second edge surface.

5. A surface light source device according to claim 4, wherein:

a front surface of said transparent panel has a substantially concave surface.

6. A surface light source device according to claim 3, wherein:

said transparent panel has a uniform thickness.

7. A surface light source device according to claim 2, further comprising:

a second light source disposed beside a second edge surface of said transparent panel, said second edge surface of said transparent panel being opposite to said first edge surface of said transparent panel, and said transparent panel having a first thickness at said first edge surface and a second thickness at said second edge surface which are both larger than a third thickness at a portion of said transparent panel removed from said first edge surface and said second edge surface.

8. A surface light source device according to claim 7, wherein:

a front surface of said transparent panel has a substantially concave surface.

9. A surface light source device according to claim 2, 3 or 7, wherein:

said transparent panel is square shaped.

10. A surface light source device according to claim 9, further comprising:

a second, third and fourth light source disposed respectively beside a second, third and fourth edge surface of said transparent panel, said transparent panel having a first thickness at said first edge surface, a second thickness at said second edge surface, a third thickness at said third edge surface, and a fourth thickness at said fourth edge surface, said first, second, third and fourth thicknesses all being larger than a fifth thickness at a portion of said transparent panel removed from said first, second, third and fourth edges.

11. A surface light source device according to claim 10, wherein:

a front surface of said transparent panel has a substantially concave surface.

* * * * *